US009450286B1

(12) United States Patent
Guerre et al.

(10) Patent No.: US 9,450,286 B1
(45) Date of Patent: Sep. 20, 2016

(54) SYSTEMS, DEVICES, AND METHODS FOR STABILIZING AN ANTENNA

(71) Applicant: ViaSat, Inc., Carlsbad, CA (US)

(72) Inventors: John Guerre, Carlsbad, CA (US); Ken Larson, Carlsbad, CA (US); Josh Righetti, Carlsbad, CA (US); Steve Shrinkle, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 120 days.

(21) Appl. No.: 13/972,994

(22) Filed: Aug. 22, 2013

Related U.S. Application Data

(60) Provisional application No. 61/700,288, filed on Sep. 12, 2012, provisional application No. 61/725,203, filed on Nov. 12, 2012.

(51) Int. Cl.
*F16M 11/02* (2006.01)
*H01Q 1/18* (2006.01)

(52) U.S. Cl.
CPC .................................... *H01Q 1/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,585,579 | A * | 2/1952 | Norden | 343/762 |
| 2,761,638 | A * | 9/1956 | Getline | 248/556 |
| 3,703,999 | A * | 11/1972 | Forys | 248/550 |
| 4,101,102 | A * | 7/1978 | Lloyd | 248/638 |
| 4,318,522 | A * | 3/1982 | Appleberry | 248/179.1 |
| 4,458,426 | A * | 7/1984 | O'Connor | 33/325 |
| 4,582,291 | A * | 4/1986 | Matthews | 248/550 |
| 4,596,989 | A * | 6/1986 | Smith | 343/709 |
| 4,645,320 | A * | 2/1987 | Muelling | 396/419 |
| 4,696,196 | A * | 9/1987 | Vucevic | 74/5.22 |
| 4,756,088 | A * | 7/1988 | Russell | 33/312 |
| 4,920,349 | A * | 4/1990 | Le Gall | 343/709 |
| 4,951,521 | A * | 8/1990 | Jacobson | 74/490.06 |
| 5,368,271 | A * | 11/1994 | Kiunke et al. | 248/638 |
| 5,396,815 | A * | 3/1995 | Polites et al. | 74/61 |
| 5,588,369 | A * | 12/1996 | Rizkalla et al. | 108/2 |
| 6,021,579 | A * | 2/2000 | Schimmels et al. | 33/645 |
| 6,285,339 | B1 * | 9/2001 | McGill | 343/882 |
| 6,396,235 | B1 * | 5/2002 | Ellington et al. | 318/649 |
| 6,433,736 | B1 * | 8/2002 | Timothy et al. | 342/359 |
| 6,540,198 | B2 * | 4/2003 | Carter et al. | 248/638 |
| 6,626,412 | B1 * | 9/2003 | Lindsay | 248/550 |
| 6,897,821 | B2 * | 5/2005 | Wong et al. | 343/757 |
| 7,065,888 | B2 * | 6/2006 | Jaklitsch et al. | 33/286 |
| 7,097,140 | B2 * | 8/2006 | Staley et al. | 244/165 |
| 7,320,389 | B1 * | 1/2008 | Myers et al. | 188/380 |
| 7,561,784 | B2 * | 7/2009 | Wescott et al. | 396/13 |
| 7,671,311 | B2 * | 3/2010 | Ellison et al. | 244/3.1 |
| 8,091,833 | B2 * | 1/2012 | von Flotow et al. | 244/131 |

(Continued)

*Primary Examiner* — Monica Millner
(74) *Attorney, Agent, or Firm* — Jonathan A. Kidney; TechLaw LLP

(57) ABSTRACT

Systems, methods, devices and apparatus are disclosed that include a chassis mount adapted to be attached to a vehicle and an antenna mount adapted to receive a satellite antenna. Further, the systems, methods, devices and apparatus that include a gyroscopic stabilizer attached to the antenna mount configured to convert vibrational torque applied to the antenna mount into a linear displacement of the antenna mount using one or more gyroscopes, each gyroscope having a control moment. In addition, the systems, methods, devices and apparatus that include a linear displacement spring attachment device connecting the antenna mount to the chassis mount and configured to provide a restoring force in opposition to the linear displacement.

24 Claims, 7 Drawing Sheets

(56) References Cited

U.S. PATENT DOCUMENTS

| | | | | |
|---|---|---|---|---|
| 8,494,725 | B2 * | 7/2013 | Zurfluh | 701/49 |
| 8,711,223 | B2 * | 4/2014 | Ellison | 348/148 |
| 8,829,899 | B2 * | 9/2014 | Polzer et al. | 324/246 |
| 8,844,896 | B2 * | 9/2014 | Pettersson | 248/646 |
| 8,897,933 | B1 * | 11/2014 | Teller et al. | 701/4 |
| 2008/0303900 | A1 * | 12/2008 | Stowe et al. | 348/143 |
| 2010/0032876 | A1 * | 2/2010 | Hiley et al. | 267/140.5 |
| 2012/0106941 | A1 * | 5/2012 | Greaves et al. | 396/421 |

* cited by examiner

700

SYSTEMS, DEVICES, AND METHODS FOR STABILIZING AN ANTENNA

CROSS-REFERENCE TO RELATED APPLICATIONS

Pursuant to 37 C.F.R 1.55, Applicants hereby state that the present application claims priority to or the benefit of an application filed before Mar. 16, 2013, and also contains at least a claim to a claimed invention that has an effective filing date that is on or after Mar. 16, 2013. Further, the present application is related to and claims benefit under 35 U.S.C. §119(e) from U.S. Provisional Patent Application No. 61/700,288 filed on Sep. 12, 2012 and U.S. Provisional Patent Application No. 61/725,203 filed on Nov. 12, 2012 the entire contents of each being incorporated herein by reference.

BACKGROUND

In the current state of the art, there is a desire and need for communication capabilities via wireless data networks. Some modern examples may be a person accessing the Internet via a WiFi network at a local coffee shop using a tablet computer or a college student calling home through a cellular voice network while walking around campus using a smartphone. In addition, people have access to data networks while traveling. For example, business travelers have access to the Internet from their portable computers on commercial airplanes and vacationing travelers have access to the Internet from their smartphones or tablet computers on leisure cruise ships.

In some examples, operators of vehicles have access to data networks for themselves or passengers. However, the conditions to access such data networks while a vehicle is moving causes challenges in acquiring and maintaining access to such data networks. For example, a helicopter pilot may be flying over an area of terrain and may have need for data (e.g. navigation data, video and voice communications, etc.) through a satellite from a data network.

Accordingly, there is a need for systems, devices, and methods for stabilizing an antenna on a vehicle for acquiring and maintaining access to data networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
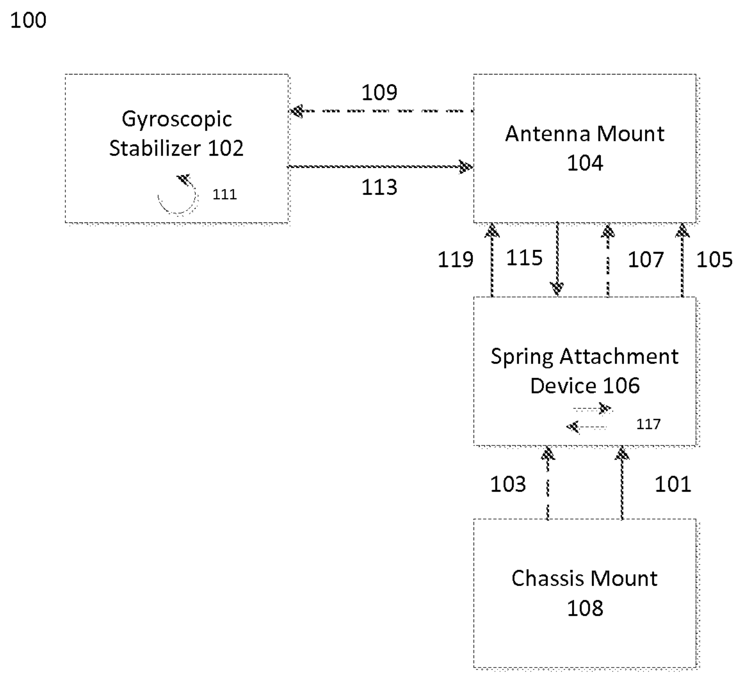
FIG. 1 is a block diagram of an example antenna stabilization system for an antenna on a vehicle, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the pending disclosure assist operators or passengers of a vehicle to acquire and maintain access to data networks while the vehicle in transit. In one embodiment, an antenna on a helicopter may be directed toward the orbiting satellite using an antenna positioning system to acquire and maintain access to a data network. However, the vibrations (1 Hz-2000 Hz) due to the rotor of the helicopter as well as the movement of the helicopter itself may provide a vibration environment that cannot be compensated for by the antenna positioning system. Conventional techniques to reduce such vibrations may include designing a traditional spring damper system to attenuate the vibrations. However, such a spring damper system in this particular vibration environment is not practical because the system would have to dampen low frequency vibrations (which are challenging using conventional techniques) and would not provide sufficient structural support to the antenna, and may interfere with the antenna positioning mechanism.

Embodiments of systems, methods, devices and apparatus are disclosed for stabilizing an antenna on a vehicle for acquiring and maintaining access to data networks. Such embodiments include a chassis mount adapted to be attached to a vehicle and an antenna mount adapted to receive a directional antenna such as a satellite antenna. Further embodiments of systems, methods, devices and apparatus include a gyroscopic stabilizer attached to the antenna mount configured to convert vibrational torque applied to the antenna mount into a linear displacement of the antenna mount using one or more gyroscopes, each gyroscope having a control moment. Additional embodiments of the systems, methods, devices and apparatus include a linear displacement spring attachment device connecting the antenna mount to the chassis mount and configured to provide a restoring force in opposition to the linear displacement. Moreover, the linear displacement spring attachment device may be configured to provide primary modes of oscillation lying substantially in a two-dimensional plane (e.g. parallel to the antenna mount).

FIG. 1 is a block diagram of an example antenna stabilization system 100 for an antenna on a vehicle. Such a system 100 includes a gyroscopic stabilizer 102, an antenna mount 104, spring attachment device 106, and a chassis mount 108. Further, the chassis mount 108 is coupled to the spring attachment device 106. In addition, the antenna mount 104 is coupled to the gyroscopic stabilizer 102 and to the spring attachment device 106. Moreover, the antenna mount 104 may be coupled to an antenna that can transmit and receive directional communications, such as from an orbiting satellite. Further, the chassis mount 108 may be coupled to a vehicle such as, but not limited to, an aircraft including a helicopter or a fixed-wing aircraft, off road vehicle, a marine vehicle, and a road vehicle or any vehicle that generates a vibration environment due to the movement of the vehicle or the vehicle components (e.g. engines, helicopter rotor, etc.) that imparts linear and rotational vibrations onto the chassis mount. In another embodiment the chassis mount may be coupled to a stationary site, however, due to the vibration environment of the site (e.g. weather/wind conditions, component at the site such as engines and other mechanism that impart vibration) the chassis mount may impart linear and rotational vibrations onto the antenna mount.

In some embodiments the vehicle operator or vehicle passengers may have need to access a data network through the antenna and satellite. However, due to the movement of the vehicle or moving components of the vehicle (e.g. engine, helicopter rotor, etc.), the antenna may experience vibrations that disrupt communication to the satellite. That is, an antenna positioning system may control or direct the antenna toward the satellite to facilitate communication. However, the vibrations experienced by the antenna may be such that the antenna positioning system may not be able to compensate to maintain communication with the satellite. Such vibrations may be linear vibrations that cause linear displacement in three dimensions as well as rotational vibrations in three dimensions. That is, the vibrations cause a linear displacement of the antenna and antenna mount 104 in the x, y, and z directions (e.g. forward/back, left/right, up/down) as well as cause the antenna and antenna mount to rotate such roll, pitch, or yaw. The antenna stabilization system 100 reduces the vibrations imparted on the antenna mount 104 and therefore on the antenna such that the antenna can maintain its position according to the antenna positioning control system so as to, e.g., maintain communication to the satellite. Specifically, the gyroscopic stabilizer 102 reduces or attenuates the rotational vibrations imparted onto the antenna mount 104 and the spring attachment device 106 reduces or attenuates the linear vibrations imparted onto the antenna mount 104.

In one embodiment, the antenna stabilization system 100 may be an apparatus or device that includes a chassis mount 108 adapted to be attached to a vehicle and an antenna mount 104 adapted to receive a satellite antenna. In addition, the apparatus or device may include a gyroscopic stabilizer 102 attached to the antenna mount 104 configured to convert vibrational torque applied to the antenna mount 104 into a linear displacement of the antenna mount 104 using one or more gyroscopes, each gyroscope having a control moment. Further, the apparatus or device may include a linear displacement spring attachment device 106 connecting the antenna mount 104 to the chassis mount 108 and configured to provide a restoring force in opposition to the linear displacement. That is, for example, vibrations may impart a linear displacement on the antenna mount 104 to move the antenna from an original or "home" position where the antenna may be able to communicate with the satellite. The linear displacement spring attachment device 106 provides a restoring force in opposition to such a linear displacement to decrease the displacement from the original or "home" position such that the antenna can maintain communication with the satellite.

Referring to FIG. 1, the chassis mount 108 may experience both linear vibrations and rotational vibrations due to the vibration environment caused by the vehicle. Moreover, the chassis mount 108 may impart both linear vibrations 101 and rotational vibrations 103 onto the spring attachment device 106. In turn, the spring attachment device 106 imparts linear vibrations 105 and rotational vibrations 107 onto the antenna mount 104. Moreover, the antenna mount 104 imparts rotational vibrations 109 onto the gyroscope stabilizer 102.

The rotational vibrations 107 may exert a vibrational torque onto the antenna mount 104. The gyroscope stabilizer 102 receives the vibrational torque through rotational vibrations 109 and due to the configuration of the gyroscopes within the gyroscopic stabilizer 102 (e.g. having one or more gyroscopes each having a control moment) translates 111 the rotational vibrations 109 into linear vibrations 113. That is, the one or more gyroscopes each have a spinning gyro wheel about a gyro spin axis and maintains its position even though it receives an external torque due to rotational vibrations imparted by the antenna mount 104. By the one or more gyroscopes of the gyroscopic stabilizer 102 arranged in a certain configuration and receiving the vibrational torque, the gyroscopes maintain their orientation and by doing so impart a linear displacement 113 onto the antenna mount 104. Further, multiple control moment gyroscopes may be used in the gyroscopic stabilizer 102. When a single gimbal control moment gyroscope is rotated a change in direction is translated into a torque that acts upon the gyroscope mount. By arranging multiple single gimbal control moment gyroscopes with gimbal axis at offset angles three axis rotational stabilization is possible. Further embodiments may include the gyroscope stabilizer 102 having one or more 3-axis, four control moment gyroscopes to translate rotational vibrations 109 to linear vibrations 113.

In addition, linear vibrations 113 are then imparted onto antenna mount 104 such that the antenna mount 104 imparts and translates the linear vibrations 113 received from the gyroscopic stabilizer 102 onto linear vibrations 115 on the spring attachment device 106. Further, linear vibrations 115 cause the displacement of the antenna mount 104 and thereby the position of the antenna from an original or "home" position. The spring attachment device 106 uses a restoring force 117 to limit the displacement of the antenna mount 104 from the original or "home" position. That is, the restoring force 117 imparts a linear displacement 119 onto the antenna mount 104 thereby reducing or attenuating the effects of the linear and rotational vibrations imparted onto the antenna mount 104 due to the vibration environment caused by the vehicle. Moreover, the linear displacement spring attachment device may be configured to provide primary modes of oscillation lying substantially in a two-dimensional plane (e.g. the two-dimensional plane parallel to the antenna mount).

In one embodiment, the spring attachment device 106 includes a plurality of spring devices arranged and configured to provide the restoring force 117. Further, the spring characteristics of the plurality of spring devices may be determined based on mass of the antenna stabilization system 100 (including the gyroscopic stabilizer 102, antenna mount 104, spring attachment device 106, and chassis mount 108) and the antenna. In addition, each of the spring devices may be a wire rope isolator (i.e. wire rope spring) or an elastomer. The restoring force 117 provided by the spring attachment device 106 may also include a dampening effect due to internal friction of the spring devices. In an alternative embodiment, discrete dampeners may be provided. Moreover, the spring devices of the spring attachment device 106 may be arranged symmetrically with respect to the antenna mount 104, in a radial arrangement, in an annular arrangement, or in an anti-symmetrical (with respect to one axis) arrangement.

In other embodiments, the spring attachment device 106 may be configured to have a fundamental frequency in a range between 5 Hz and 10 Hz. For example, the spring attachment device 106 may be configured to have a fundamental frequency of 8 Hz. That is, the spring attachment device 106 reduces or attenuates vibrations that have a frequency of 8 Hz or higher. However, the spring attachment device 106 allows vibrations having frequency lower than 8 Hz to be imparted onto the antenna mount 104. Thus, when the antenna stabilization system 100 is coupled to a helicopter, the helicopter may pitch, yaw, or otherwise move such that the helicopter imparts vibrations at a frequency less than 8 Hz. The antenna mount 104, and thereby the antenna, are allowed to move in accordance to the helicopter. However, vibrations (both linear and rotational) imparted by the helicopter rotor that are at a frequency of 8 Hz and higher are reduced and attenuated so that the antenna can maintain its position to communicate with the satellite. Thus, in one embodiment, the spring attachment device 106 is configured to counteract and dampen vibrations in a frequency range between 10 Hz and 2000 Hz associated with a helicopter rotor and the spring attachment device 106 allows rotation to be imparted to the antenna mount 104 below approximately 2 Hz. It is understood that the specific frequencies described herein refer to approximate ranges, and that the frequency characteristics have an associated "roll-off" such that frequency response characteristics gradually change over a range, and that the specific frequencies may refer to a 3-dB corner frequency, as is known to those of skill in the art. In some embodiments, therefore, the system described herein utilizes materials having suitable frequency responses so as to provide a reduction in vibrational rotations associated with a mechanical noise imparted on the system, while other rotations such as macro-scale vehicular movement, typically of a relatively lower frequency and/or larger magnitude, are imparted to the antenna mount. Some applications of the system described herein may employ antennas or other directional devices having a separate steering or pointing mechanism, and the system described herein may be utilized to relax the performance criterion for such steering or pointing systems in those applications.

Figure 2:
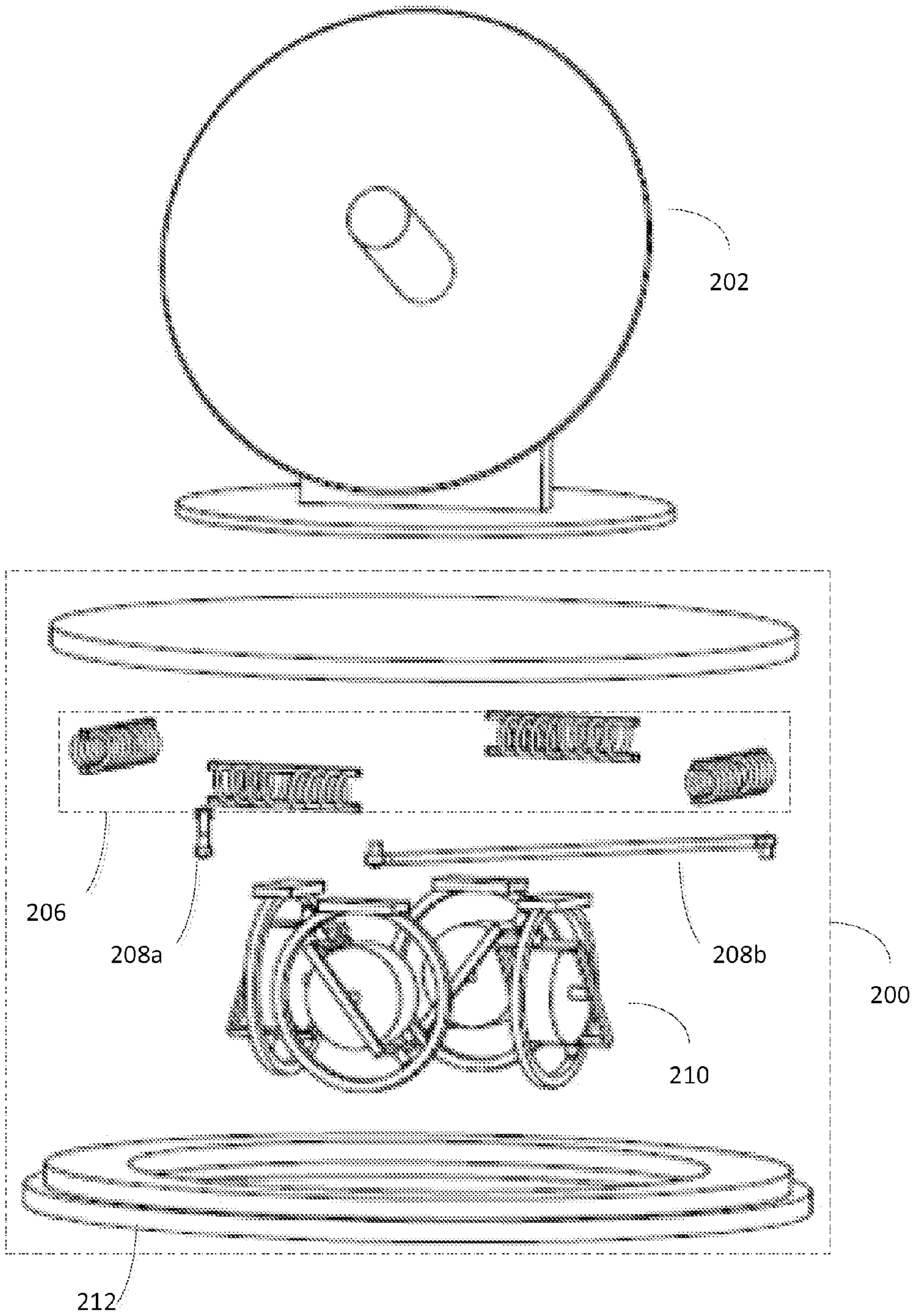
FIG. 2 is an example of an antenna stabilization system adapted to receive an antenna assembly, in accordance with some embodiments.

FIG. 2 is an example of an antenna stabilization system 200 adapted to receive an antenna assembly 202. The antenna stabilization system 200 includes an antenna mount 204, a plurality of spring devices 206 to form a spring attachment device, a plurality of gyroscopes 210 to form a gyroscopic stabilizer, and a chassis mount 212. In one embodiment, the chassis mount 212 is coupled to the spring attachment device and the spring attachment device is further coupled to the antenna mount 204. In addition, the gyroscopic stabilizer is coupled to the antenna mount 204. Moreover, the antenna mount 204 is adapted to receive or couple to an antenna assembly 202 that includes a satellite antenna. In a further embodiment the spring devices 206 may be wire rope springs (i.e. wire rope isolators) and the spring attachment device may have the wire rope springs arranged in annular arrangement. In other embodiments, the spring devices may be arranged in a radial arrangement or any symmetrical arrangement as well as an anti-symmetrical arrangement that may provide a restoring force to limit the linear displacement imparted onto the antenna mount 204 due to the vibration environment. In an additional embodiment, the spring attachment device is configured to provide primary modes of oscillation lying substantially in a two-dimensional plane that is parallel to the antenna mount 204 and chassis mount 212. Thus, in one embodiment, the restoring forces provided by the spring attachment device may lie primarily within a given plane, while the spring attachment device is effectively rigid in the direction normal to the plane in order to limit displacement about a normal to the two-dimensional place. In a further embodiment, the spring attachment device may also provide a restoring force to a linear translation normal to the plane. In further alternative embodiments, the spring attachment device may be configured to have asymmetrical restoring forces along the three spatial dimensions. These embodiments may be configured to accommodate environments where the anticipated rotational vibrations along certain axes differ in magnitude, or the importance of eliminating rotational vibrations differs along certain axes, or a combination thereof.

The chassis mount 212 is coupled to a vehicle or other movable equipment or component. The antenna stabilization system 202 reduces or attenuates linear and rotational vibrations due to the vibration environment of the vehicle (associated with the propulsion of the vehicle itself or movement of vehicle components (e.g. engine, helicopter rotor, etc.)). Moreover, the chassis mount 212 may impart both linear and rotational vibrations onto the spring attachment device. In turn, the spring attachment device imparts linear and rotational vibrations onto the antenna mount 204. Further, the antenna mount 204 imparts rotational vibrations onto the gyroscope stabilizer.

The rotational vibrations may exert a vibrational torque onto the antenna mount 204. The gyroscope stabilizer receives the vibrational torque through rotational vibrations imparted from the antenna mount 204 and due to the configuration of the gyroscopes 210 within the gyroscopic stabilizer (e.g. having one or more gyroscopes each having a control moment) translates the rotational vibrations into linear vibrations.

In addition, the translated linear vibrations are then imparted onto antenna mount 204. The antenna mount 204 imparts the linear vibrations received from the gyroscopic stabilizer onto the spring attachment device. Further, the linear vibrations cause the displacement of the antenna mount 204 and thereby the position of the antenna and antenna assembly 202 from an original or "home" position. Such a displacement may disrupt communications between the antenna and the satellite. Thus, the spring attachment device uses a restoring force to limit the displacement of the antenna mount 204 from the original or "home" position. That is, the restoring force imparts a linear displacement onto the antenna mount 104 thereby reducing or attenuating the effects of the linear and rotational vibrations imparted onto the antenna mount 204 due to the vibration environment of vehicle.

In another embodiment, the antenna stabilization system 200 may include mechanical links (208*a* and 208*b*) that couple the chassis mount 212 to the antenna mount 204. Such mechanical links to limit displacement about a normal to the two-dimensional plane parallel to the antenna mount 204 and chassis mount 212.

Figure 3:
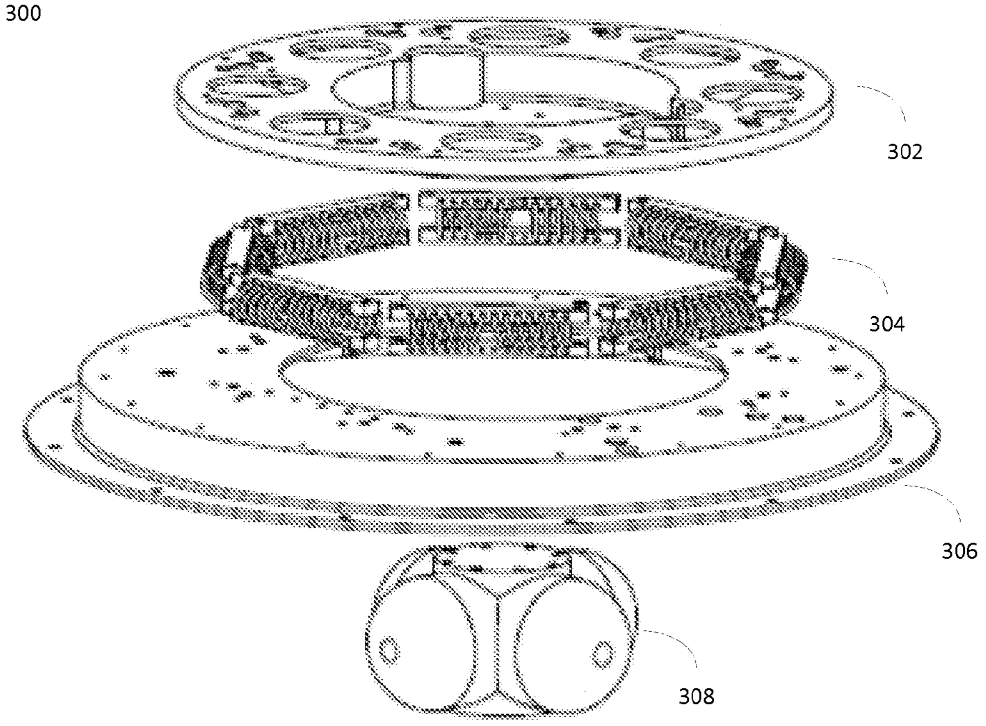
FIG. 3 is another example of an antenna stabilization system, in accordance with some embodiments.

FIG. 3 is another example of an antenna stabilization system 300. Further, the antenna stabilization system includes an antenna mount 302, a spring attachment device 304, a chassis mount 306, and a gyroscopic stabilizer 308. The chassis mount 306 is coupled to the spring attachment device 304 and the spring attachment device 304 is coupled to the antenna mount 304. Further, the gyroscopic stabilizer 308 is coupled to the antenna mount 302. In addition, the antenna mount 302 is adapted to receive or couple to an antenna. Moreover, the chassis mount 308 is coupled to a vehicle.

The antenna stabilization system 300 reduces or attenuates linear and rotational vibrations due to the movement of the vehicle. Moreover, the chassis mount 308 may impart both linear and rotational vibrations onto the spring attachment device 304. In turn, the spring attachment device 304 imparts linear and rotational vibrations onto the antenna mount 302. Further, the antenna mount 302 imparts rotational vibrations onto the gyroscope stabilizer 308.

The rotational vibrations may exert a vibrational torque onto the antenna mount 302. The gyroscope stabilizer 308 receives the vibrational torque through rotational vibrations imparted from the antenna mount 302 and due to the configuration of the gyroscopes within the gyroscopic stabilizer 308 (e.g. having one or more gyroscopes each having a control moment) translates the rotational vibrations into linear vibrations. In another embodiment the gyroscopic stabilizer includes 3-axis, four control moment gyroscopes to translate rotational vibrations into linear vibrations.

In addition, the translated linear vibrations are then imparted onto antenna mount 302. The antenna mount 302 imparts the linear vibrations received from the gyroscopic stabilizer 308 onto the spring attachment device 304. Further, the linear vibrations cause the displacement of the antenna mount 302 and thereby the position of the antenna from an original or "home" position. Such a displacement may disrupt communications between the antenna and the satellite. Thus, the spring attachment device 304 uses a restoring force to limit the displacement of the antenna mount 302 from the original or "home" position. That is, the restoring force imparts a linear displacement onto the antenna mount 104 thereby reducing or attenuating the effects of the linear and rotational vibrations imparted onto the antenna mount 302 due to the vibration environment of the vehicle.

In a further embodiment, the spring attachment device 304 includes a plurality of spring devices configured in an annular arrangement. However, other embodiments may include the spring devices configured in a radial arrangement as well as in symmetrical and anti-symmetrical (with respect to at least one axis) arrangements to limit the linear displacement of antenna mount 302.

Figure 4:
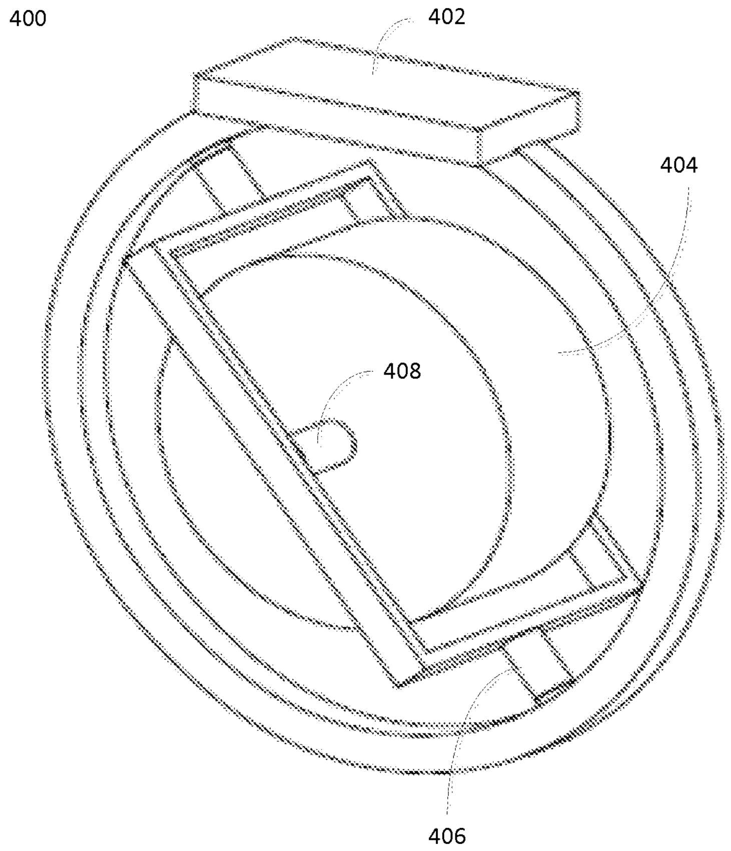
FIG. 4 is an example control moment gyroscope that is used in a gyroscopic stabilizer of an antenna stabilization system, in accordance with some embodiments.

FIG. 4 is an example control moment gyroscope 400 that may be used in a gyroscopic stabilizer of an antenna stabilization system. Such a gyroscope 400 includes an assembly mount 402, a gyro wheel 404, a gimbal axis 406, and a gyro spin axis 408. The assembly mount 402 is coupled to an antenna mount of the antenna stabilization system. One or more gyroscopes 400 are used in the gyroscopic stabilizer. The gyroscope 400 includes a spinning gyro wheel 404 about the gyro spin axis 408 maintains its position even though it receives an external torque due to rotational vibrations imparted by an antenna mount. By the one or more gyroscopes of the gyroscopic stabilizer arranged in a certain configuration and receiving the vibrational torque, the gyroscopes maintain their orientation and by doing so impart a linear displacement onto the antenna mount. Further, multiple control moment gyroscopes may be used in the gyroscopic stabilizer. When a single gimbal control moment gyroscope is rotated a change in direction is translated into a torque that acts upon the gyroscope mount. By arranging multiple single gimbal control moment gyroscopes with gimbal axis at offset angles three axis rotational stabilization is possible.

Figure 5:
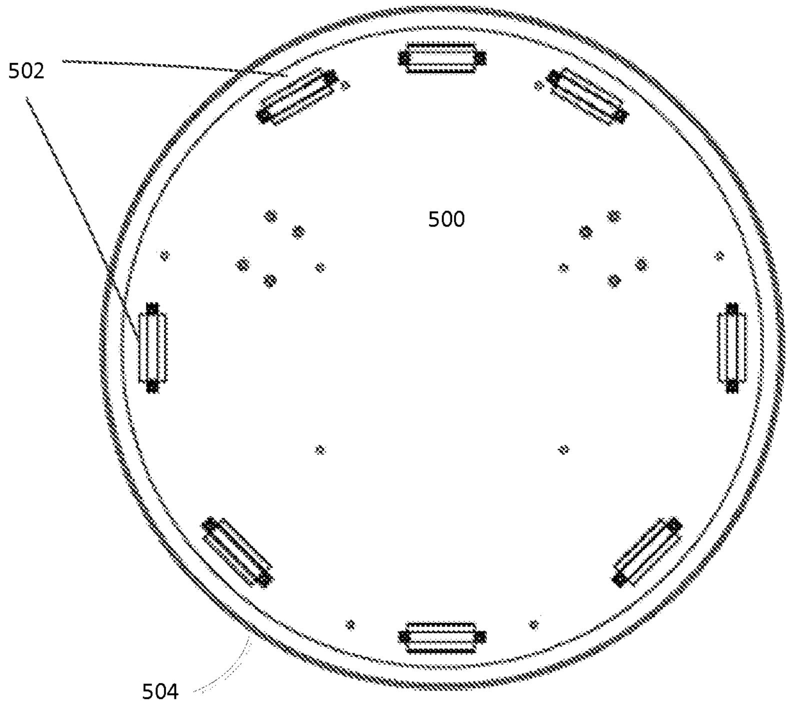
FIG. 5 is an example spring attachment device coupled to a mount that is used in an antenna stabilization system, in accordance with some embodiments.

FIG. 5 is an example spring attachment device 500 coupled to a mount 504 that is used in an antenna stabilization system. The spring attachment device 500 includes a plurality of spring devices 502 configured in an anti-symmetrical annular arrangement (anti-symmetrical with respect to at least one axis). In one embodiment, the spring devices 502 are wire rope isolators (e.g. wire rope springs). Further, wire rope isolators configured in an anti-symmetrical annular pattern allow decoupling of a vibration environment of a vehicle from an antenna mounted on the vehicle (Note, the spring arrangement of the spring attachment device 500 is symmetrical with respect to a y-axis but not symmetrical with respect to the x-axis). That is, that the spring attachment device 500 having wire rope isolators may be able to limit the liner displacement in a two dimensional plane parallel to the mount 504 as well capable of limiting displacement normal to the two dimensional plane. Further the spring attachment device 500 may also limit rotations within the two dimensional plane about the normal.

Further, as shown in FIG. 5, when choosing the spring characteristic values and arrangement in the spring attachment device 500, spring placement may not necessarily be symmetrical. For example, if a vibration mode affects predominately one axis, different spring rates and physical arrangement may be used to compensate for different vibration profiles in each axis. Thus, the spring device 502 in the spring attachment device 500 may be tuned to limit vibrations in one axis (e.g. y-axis) that is predominately affects by vibrations.

In further embodiments, the stiffness and other characteristics of the spring devices are selected based on a fundamental frequency of vibrations sought to be reduced or attenuated as well as based on the mass of the antenna stabilization system (including a gyroscopic stabilizer, antenna mount, spring attachment device, and chassis mount) and antenna.

Wire rope isolators have metal memory and preload so that the spring attachment device 500 may effectively provide a restoring force when imparted with linear displacement from an antenna mount. In other embodiments, different spring devices such as elastomers may be used in the spring attachment device 500.

Figure 6:
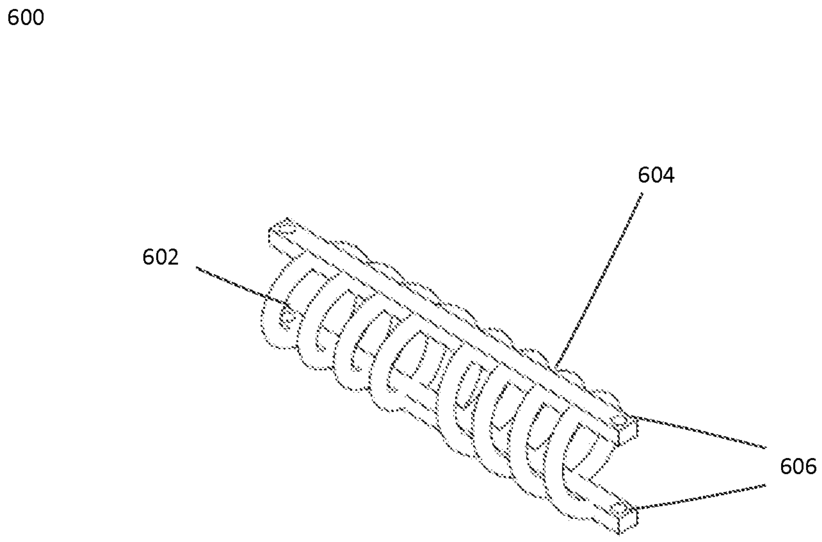
FIG. 6 is an example wire rope isolator spring device that is used in a spring attachment device of an antenna stabilization system, in accordance with some embodiments.

FIG. 6 is an example wire rope isolator spring device 600 that is used in a spring attachment device of an antenna stabilization system. The wire rope isolator 600 includes the wire rope spring 602, the spring mount 604, and holes 606 to mount the wire rope isolator to an antenna mount and a chassis mount. In one embodiment, such wire rope isolators may be configured in an arrangement (e.g. radial, annular, T, symmetric etc.) to form a spring attachment device. Such a spring attachment device provides a restoring force in opposition to a linear displacement due to linear and rotational vibrations imparted onto the antenna mount. Further, the spring attachment device may be used to limit rotation about an axis normal the antenna mount. Further, the spring attachment device may limit linear displacement in the two dimensional plane parallel to the antenna mount as well as normal to the two dimensional place plane/antenna mount. The spring characteristics of the wire rope isolators may be determined based on mass of the antenna stabilization system including a gyroscopic stabilizer, chassis mount, spring attachment device, antenna mount as well as the satellite antenna and antenna assembly. The spring characteristics further determine the fundamental frequency of the spring attachment device. For example, the spring characteristics may be determined such that the spring attachment device reduces or attenuates displacement caused by vibrations at having a frequency of 8 Hz or higher but allows displacement caused by vibrations at a frequency lower than 8 Hz.

Figure 7:
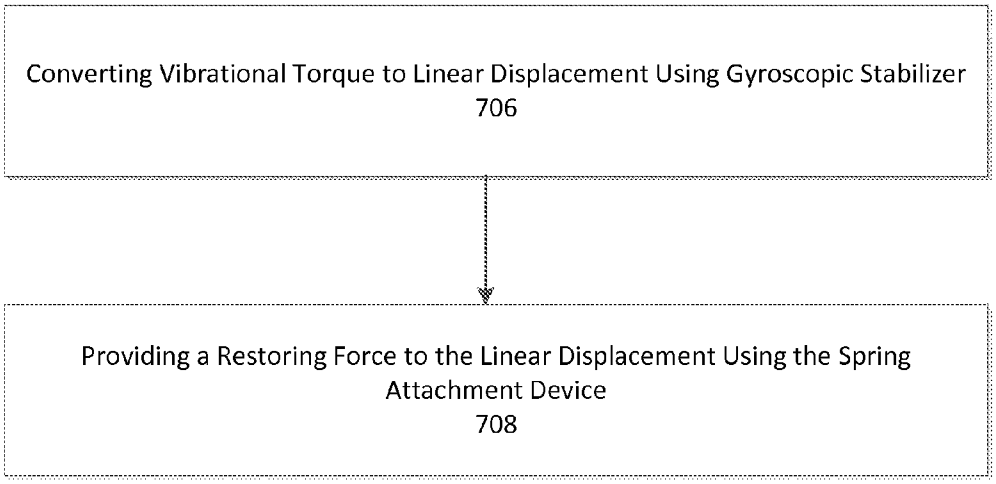
FIG. 7 is a flowchart of an example method to stabilize an antenna on a vehicle, in accordance with some embodiments.

FIG. 7 is a flowchart of an example method 700 to stabilize an antenna on a vehicle by an antenna stabilization system. The method 700 includes converting vibrational torque applied to the antenna mount into a linear displacement of the antenna mount using a gyroscopic stabilizer, as shown in block 706. Further, the gyroscopic stabilizer may be coupled to the antenna mount adapted to receive a satellite antenna. In an embodiment, the gyroscopic stabilizer is not coupled to the antenna mount during the manufacturing process of such an antenna stabilization system but is coupled during installation of the antenna stabilization system onto the vehicle. In an alternate embodiment, the gyroscope stabilizer may be coupled to the antenna mount during the manufacturing process of the antenna stabilization system. In another embodiment, the gyroscopic stabilizer includes one or more gyroscopes, each gyroscope having a control moment. In a further embodiment, the one or more gyroscopes may be a 3-axis, four control moment gyroscope. By the one or more gyroscopes of the gyroscopic stabilizer arranged in a certain configuration and receiving the vibrational torque, the gyroscopes maintain their orientation and by doing so impart a linear displacement onto the antenna mount.

Moreover, the method 700 includes providing a restoring force in opposition to the linear displacement using the linear displacement spring attachment device, as shown in block 708. That is, the linear displacement moves the antenna mount and thereby the antenna from an original or "home" position. The restoring force limits the linear displacement of the antenna mount from this original or "home" position thereby reducing or attenuating the effects of the linear and rotational vibrations imparted onto the antenna mount 104 due to the vibration environment caused by the vehicle. The restoring force provided by the linear displacement spring attachment device is due to internal friction of its spring devices. Moreover, the linear displacement spring attachment device may be coupled to the antenna mount and a chassis mount adapted to be attached to the vehicle. In an embodiment, the linear displacement spring attachment device is not coupled to the antenna mount and/or the chassis mount during the manufacturing process of such an antenna stabilization system but is coupled during installation of the antenna stabilization system on to the vehicle. In an alternate embodiment, the linear displacement spring attachment device may be coupled to the antenna mount and/or chassis mount during the manufacturing process of the antenna stabilization system, In one embodiment, the linear displacement spring attachment device is configured to provide primary modes of oscillation lying substantially in a two-dimensional plane parallel to the antenna mount. In another embodiment, the linear displacement spring attachment device includes one or more mechanical links to limit rotation about a normal to the two-dimensional plane.

Further, the chassis mount may be a helicopter mount, off road vehicle mount, a marine vehicle mount, aircraft mount, and a road vehicle mount. In another embodiment the chassis mount may be coupled to ta stationary site, however, due to the vibration environment of the site (e.g. weather/wind conditions, component at the site such as engines and other mechanism that impart vibration) the chassis mount may impart linear and rotational vibrations onto the antenna mount.

In one embodiment the linear displacement spring attachment device may include a plurality of spring devices. Further, the spring devices may be configured in a variety of arrangement that include a radial arrangement, an annular arrangement, or a symmetrical or anti-symmetrical (with respect to at least one axis) arrangements. In addition, the spring characteristics of the spring devices are determined based on mass of the gyroscopic stabilizer, chassis mount, linear spring attachment device, antenna mount and the satellite antenna. Moreover, the spring devices may be wire rope isolators or elastomers.

In an additional embodiment, an antenna stabilization system is prepared by a process comprising the steps of a plurality of spring devices in an arrangement to provide a linear displacement spring attachment device. The process further includes coupling a gyroscopic stabilizer to an antenna mount, the gyroscopic stabilizer having one or more gyroscopes, each having a control moment, to provide a gyroscopic stabilizer. In addition, the process includes coupling the linear displacement spring attachment device to the antenna mount adapted to be coupled to a satellite antenna. Moreover, the process includes connecting the linear displacement spring attachment device to a chassis mount adapted to be attached to a vehicle. Such an antenna stabilization system reduces or attenuates the effects of the linear and rotational vibrations imparted onto the antenna mount 104 due to the vibration environment caused by the vehicle.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile antenna stabilization apparatus comprising:
a vehicle chassis mount;
an antenna mount;
a stabilizing gyroscope attached to the antenna mount, the stabilizing gyroscope converting vibrational torque of the antenna mount to linear displacement of the antenna mount; and
a spring attachment device comprising a plurality of spring devices connected between the antenna mount and the chassis mount, the spring attachment device providing a restoring force in opposition to the linear displacement.

2. The apparatus of claim 1, wherein the plurality of spring devices are in an arrangement, the arrangement selected from the group consisting of a radial arrangement, an annular arrangement, and an arrangement that is anti-symmetrical along one axis.

3. The apparatus of claim 1, wherein the plurality of spring devices preclude the linear displacement of the antenna mount.

4. The apparatus of claim 1, wherein the spring characteristics of the plurality of spring devices are determined based on mass of the apparatus and the antenna.

5. The apparatus of claim 1, wherein each of the plurality of spring devices is selected from a group consisting of a wire rope isolator and an elastomer.

6. The apparatus of claim 1, wherein the plurality of spring devices are arranged symmetrically with respect to the antenna mount.

7. The apparatus of claim 1, wherein the spring attachment device has a fundamental frequency in a range between 5 Hz and 10 Hz.

8. The apparatus of claim 1, wherein the spring attachment device dampens vibrations in a frequency range between 10 Hz and 2000 Hz associated with a helicopter rotor.

9. The apparatus of claim 1, wherein the spring attachment device allows rotation to be imparted to the antenna mount below 2 Hz.

10. The apparatus of claim 1, wherein the chassis mount is selected from the group consisting of a helicopter mount, off road vehicle mount, a marine vehicle mount, aircraft mount, and a road vehicle mount.

11. The apparatus of claim 1, wherein the restoring force provided by the spring attachment device is due to internal friction of the plurality of spring devices.

12. A mobile antenna stabilization method comprising:
converting vibrational torque applied to an antenna mount into a linear displacement of the antenna mount using one or more stabilizing gyroscopes, each gyroscope coupled to the antenna mount; and
providing a restoring force in opposition to the linear displacement using a spring attachment device, the spring attachment device comprising a plurality of spring devices, coupled to the antenna mount and a vehicle chassis mount.

13. The method of claim 12, wherein the plurality of spring devices are in an arrangement, the arrangement selected from the group consisting of a radial arrangement, an annular arrangement, and an arrangement that is anti-symmetrical along one axis.

14. The method of claim 12, wherein spring characteristics of the plurality of spring devices are determined based on mass of the stabilizing gyroscope, chassis mount, linear spring attachment device, antenna mount and the satellite antenna.

15. The method of claim 12, wherein each of the plurality of spring devices is selected from a group consisting of a wire rope isolator and an elastomer.

16. The method of claim 12, wherein the plurality of spring devices are arranged symmetrically with respect to the antenna mount.

17. The method of claim 12, wherein the spring attachment device has a fundamental frequency in a range between 5 Hz and 10 Hz.

18. The method of claim 12, wherein the spring attachment device dampens vibrations in a frequency range between 10 Hz and 2000 Hz associated with a helicopter rotor.

19. The method of claim 12, wherein the spring attachment device allows rotation to be imparted to the antenna mount below 2 Hz.

20. The method of claim 12, wherein the chassis mount is selected from the group consisting of a helicopter mount, off road vehicle mount, a marine vehicle mount, aircraft mount, and a road vehicle mount.

21. The method of claim 12, wherein the restoring force provided by the spring attachment device is due to internal friction of the plurality of spring devices.

22. A mobile antenna stabilization system prepared by a process comprising the steps of:
coupling one or more stabilizing gyroscopes to an antenna mount, wherein the one or more stabilizing gyroscopes convert vibrational torque of the antenna mount into linear displacement of the antenna mount;
coupling a plurality of spring devices in an arrangement to the antenna mount and a chassis mount, the spring devices providing a restoring force in opposition to the linear displacement to preclude linear displacement of the antenna mount; and
connecting the chassis mount to a vehicle.

23. The apparatus of claim 1, wherein the stabilizing gyroscope(s) precludes rotational movement of the antenna mount.

24. The apparatus of claim 1, wherein a top portion of the plurality of spring devices being horizontally oriented is coupled to the antenna mount and a bottom portion thereof is coupled to the chassis mount.

* * * * *